United States Patent
Koda

(10) Patent No.: US 9,832,323 B2
(45) Date of Patent: *Nov. 28, 2017

(54) IMAGE PROCESSING APPARATUS THAT REDUCES SETTING OPERATION BY USER, IMAGE FORMING METHOD, AND RECORDING MEDIUM

(71) Applicant: Kyocera Document Solutions Inc., Osaka (JP)

(72) Inventor: Isao Koda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,085

(22) Filed: May 29, 2016

(65) Prior Publication Data

US 2016/0352925 A1 Dec. 1, 2016

(30) Foreign Application Priority Data

May 29, 2015 (JP) ................. 2015-109619

(51) Int. Cl.
*H04N 1/04* (2006.01)
*H04N 1/32* (2006.01)
(Continued)

(52) U.S. Cl.
CPC ..... *H04N 1/00037* (2013.01); *H04N 1/00588* (2013.01); *H04N 1/00694* (2013.01);
(Continued)

(58) Field of Classification Search
CPC .......... H04N 1/00037; H04N 1/00588; H04N 1/00694; H04N 1/00721; H04N 1/10; H04N 2201/0094; H04N 1/4413; H04N 1/00689
(Continued)

(56) References Cited

U.S. PATENT DOCUMENTS 7,327,483 B2 * 2/2008 Morisaki .............. H04N 1/2104
358/1.15
7,375,861 B2 * 5/2008 Lebo .................. H04N 1/00681
358/474
(Continued)

FOREIGN PATENT DOCUMENTS

JP 2009-231887 A 10/2009
JP 2011-077812 A 4/2011

*Primary Examiner* — Cheukfan Lee
(74) *Attorney, Agent, or Firm* — James Judge

(57) ABSTRACT

An image processing apparatus includes a platen, a fixed-document detection unit, a determination unit, and a processing-target selection unit. The determination unit determines whether the document on the platen is a left document or not when the document on the document tray and the document on the platen are detected, upon acceptance of the document-reading-starting instruction by the instruction accepting unit. The processing-target selection unit sets image data obtained by a conveyed-document reading unit as a processing target when the determination unit determines that the document on the platen is the left document, and inquires which image data obtained by the conveyed-document reading unit and a fixed-document reading unit, to be set as the processing target of the user when the determination unit determines that the document on the platen is not the left document.

8 Claims, 6 Drawing Sheets

(51) Int. Cl.
*H04N 1/40* (2006.01)
*H04N 1/00* (2006.01)
*H04N 1/10* (2006.01)

(52) U.S. Cl.
CPC ........... *H04N 1/00721* (2013.01); *H04N 1/10* (2013.01); *H04N 2201/0094* (2013.01)

(58) Field of Classification Search
USPC ........ 358/488, 486, 466, 468, 497, 496, 474
See application file for complete search history.

(56) References Cited

U.S. PATENT DOCUMENTS

| | | | |
|---|---|---|---|
| 8,351,091 B2* | 1/2013 | Kojima | H04N 1/00222 358/1.15 |
| 9,019,571 B2* | 4/2015 | Yamada | H04N 1/00408 358/403 |
| 2012/0216250 A1* | 8/2012 | Chigusa | G06F 21/34 726/2 |
| 2013/0057920 A1* | 3/2013 | Nagata | H04N 1/00411 358/1.16 |
| 2016/0191741 A1* | 6/2016 | Tsukimori | H04N 1/17 358/486 |
| 2016/0295073 A1* | 10/2016 | Segarra, Jr. | H04N 1/4413 |
| 2016/0352925 A1* | 12/2016 | Koda | H04N 1/00037 |
| 2016/0352944 A1* | 12/2016 | Koda | H04N 1/00689 |

\* cited by examiner

IMAGE PROCESSING APPARATUS THAT REDUCES SETTING OPERATION BY USER, IMAGE FORMING METHOD, AND RECORDING MEDIUM

INCORPORATION BY REFERENCE

This application is based upon, and claims the benefit of priority from, corresponding Japanese Patent Application No. 2015-109619 filed in the Japan Patent Office on May 29, 2015, the entire contents of which are incorporated herein by reference.

BACKGROUND

Unless otherwise indicated herein, the description in this section is not prior art to the claims in this application and is not admitted to be prior art by inclusion in this section.

There is known a configuration that locates a moveable carriage below a platen on which a document of a reading target is placed, as a typical image processing apparatus, such as a copier, a facsimile, a scanner, and a multi-functional peripheral. Such an image processing apparatus can read an image of a document placed on a platen with its image-reading target surface placed toward the platen, by moving a carriage. An image processing apparatus employs a document feeder to read images of a plurality of documents in a high speed. The document feeder automatically feeds a document loaded in a document tray one by one to an image reading position. This ensures that the image processing apparatus can continuously read each document.

A document feeder is often integrally constituted with a platen cover that opens and closes a platen. When a document is left on a platen, an image processing apparatus including such a document feeder broadly employs a configuration where an image reading position of a document, which is conveyed by the document feeder, is set outside a document placing range of the platen for preventing a damage or similar problem caused by contact between a document conveyed by the document feeder and the left document. Such image processing apparatus locates a slit glass (a reading glass) corresponding to the image reading position of the document feeder. This slit glass is located spaced apart from the platen.

For example, when the documents are present both on a document feeder and on a platen, there is known an image reading apparatus that enables a user to set preliminarily priority on which document to read. This configuration enables the image reading apparatus to continuously read images even when a paper document is mixed with documents that can be placed on a document feeder and cannot be placed on a document feeder.

Further, when the documents, which are placed both on a document feeder and on a platen, are situated, there is known an image reading apparatus that causes a user to select which images of the documents to read. This configuration ensures that the image reading apparatus executes image reading of the document that the user desires.

SUMMARY

An image processing apparatus according to one aspect of the disclosure includes a document conveying mechanism, a conveyed-document reading unit, a conveyed-document detection unit, a platen, a fixed-document reading unit, a fixed-document detection unit, an instruction accepting unit, a determination unit, and a processing-target selection unit. The document conveying mechanism conveys a document placed on a document tray to an image reading position one by one. The conveyed-document reading unit obtains image data of the document conveyed to the image reading position by the document conveying mechanism. The conveyed-document detection unit detects existence of a document on the document tray. The platen has a document loading surface for a document placed without conveyance by the document conveying mechanism. The fixed-document reading unit obtains image data of the document placed on the platen. The fixed-document detection unit detects existence of the document on the platen. The instruction accepting unit accepts a document-reading-starting instruction by a user. The determination unit determines whether the document on the platen is a left document or not when the document on the document tray and the document on the platen are detected by the conveyed-document detection unit and the fixed-document detection unit, upon acceptance of the document-reading-starting instruction by the instruction accepting unit. The processing-target selection unit sets the image data obtained by the conveyed-document reading unit as a processing target when the determination unit determines that the document on the platen is the left document, and inquires which image data obtained by the conveyed-document reading unit and the fixed-document reading unit, to be set as the processing target of the user when the determination unit determines that the document on the platen is not the left document.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
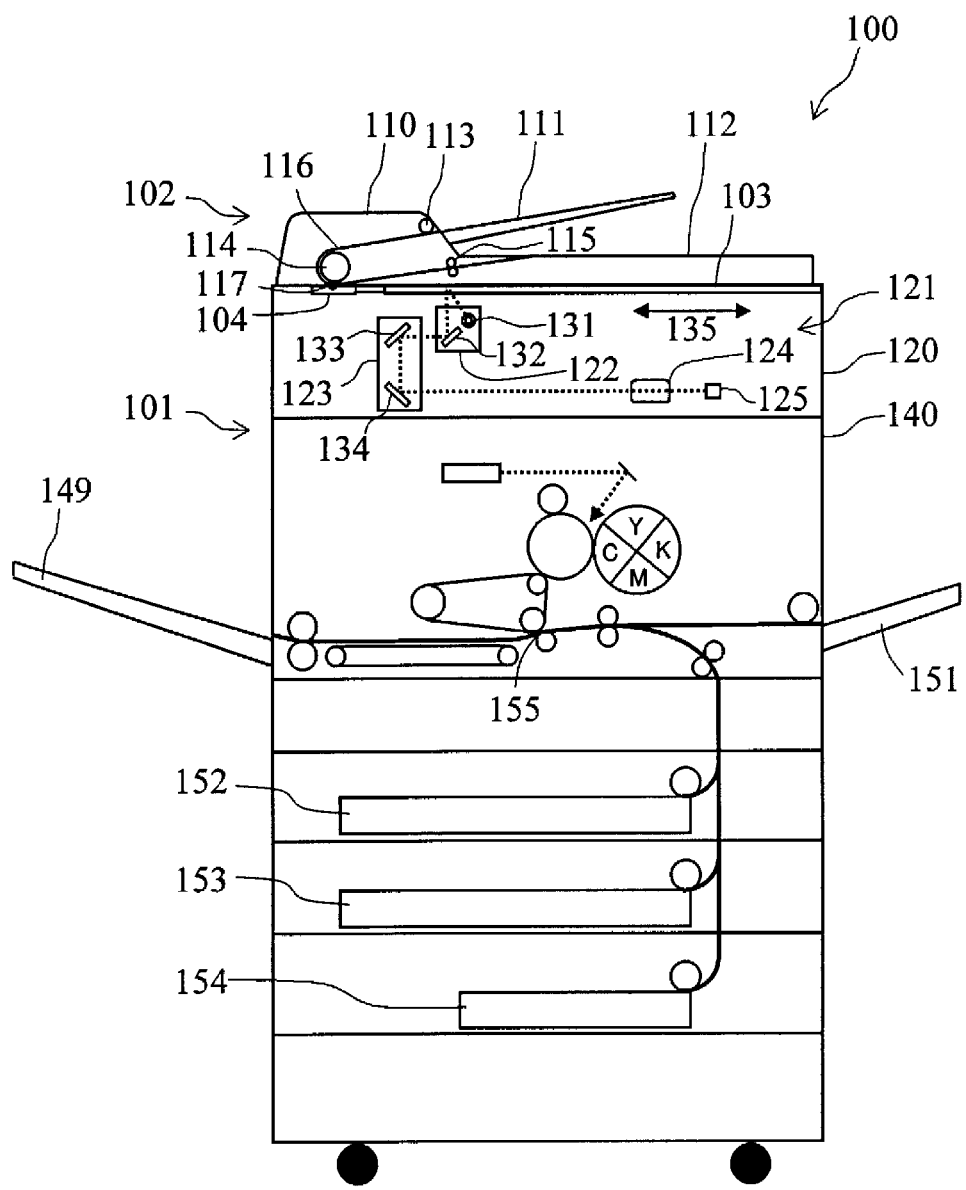
FIG. 1 schematically illustrates an overall configuration of a multi-functional peripheral according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure in detail by referring to the accompanying drawings. The following embodies the disclosure as a digital multi-functional peripheral including a document feeder (a document conveying mechanism).

FIG. 1 schematically illustrates an exemplary overall configuration of a digital multi-functional peripheral according to the embodiment. As illustrated in FIG. 1, a multi-functional peripheral 100 includes a main body 101 with an image reading unit 120 and an image forming unit 140, and a platen cover 102 mounted above the main body 101. A platen 103, which is constituted of a transparent plate such as a contact glass, is located on the top surface of the main body 101, and is opened and closed with the platen cover 102.

The image reading unit 120 is located below the platen 103. The image reading unit 120 reads an image of a document by a scanning optical system 121 and generates digital data (image data) of the image. A document can be placed on the platen 103.

The scanning optical system 121 includes a first carriage 122 and a second carriage 123. The first carriage 122 includes a linear light source 131 and a mirror 132, and the second carriage 123 includes a mirror 133 and a mirror 134. The light source 131 lights a document. The mirrors 132, 133, and 134 guide the reflected light from the document to a condensing lens 124, and the condensing lens 124 forms an image of the light image on a light receiving surface of a line image sensor 125.

In the scanning optical system 121, the first carriage 122 and second carriage 123 are located reciprocatably in a sub-scanning direction 135. The line image sensor 125 can read the image of the document placed on the platen 103 by movement of the first carriage 122 and second carriage 123 in the sub-scanning direction 135. The line image sensor 125 generates image data of the document from the light image having entered the light receiving surface.

The generated image data can be printed on a transfer target body such as a paper sheet in the image forming unit 140. Further, the generated image data can be transmitted to other devices over a network, via a network interface or similar interface (not illustrated).

The image forming unit 140 prints image data generated by the image reading unit 120 and image data received from the other devices connected to the network on a paper sheet. The image forming unit 140 feeds a paper sheet from a manual bypass tray 151, sheet feed cassettes 152, 153, and 154, and similar cassette to a transfer unit 155 that transfers a toner image. The paper sheet undergoes transferring of a toner image in the transfer unit 155 and is discharged into a sheet discharge tray 149.

The platen cover 102 includes a document feeder 110 in such multi-functional peripheral 100. The document feeder 110 sends out the document set in a document tray 111 to a conveyance path 116 one by one by a pickup roller 113. An image reading position 117 is located on the conveyance path 116. A conveyance roller 114 conveys the document to the image reading position 117. The top surface of the image reading unit 120 includes not only the platen 103 but also a slit glass (a reading window) 104 for reading the document corresponding to the image reading position 117. The multi-functional peripheral 100 includes the slit glass 104 on the top surface of the main body 101 that is adjacent to the platen 103 in the moving direction of the first carriage 122 and second carriage 123.

When reading the image of the document set on the document tray 111, the image reading unit 120 causes the first carriage 122 and second carriage 123 to be temporarily motionless, aligning the first carriage 122 and the second carriage 123 with the image reading position 117. When the document passes through the image reading position 117, the light source 131 lights the document. The light from the light source 131 transmits the slit glass 104, then is reflected from the document, which passes through the image reading position 117, and guided to the line image sensor 125 by the mirrors 132, 133, 134, and the condensing lens 124. The line image sensor 125 generates the image data based on the received light. The document, which has passed through the image reading position 117, is discharged by a discharging roller 115 into a sheet discharge tray 112.

Figure 2:
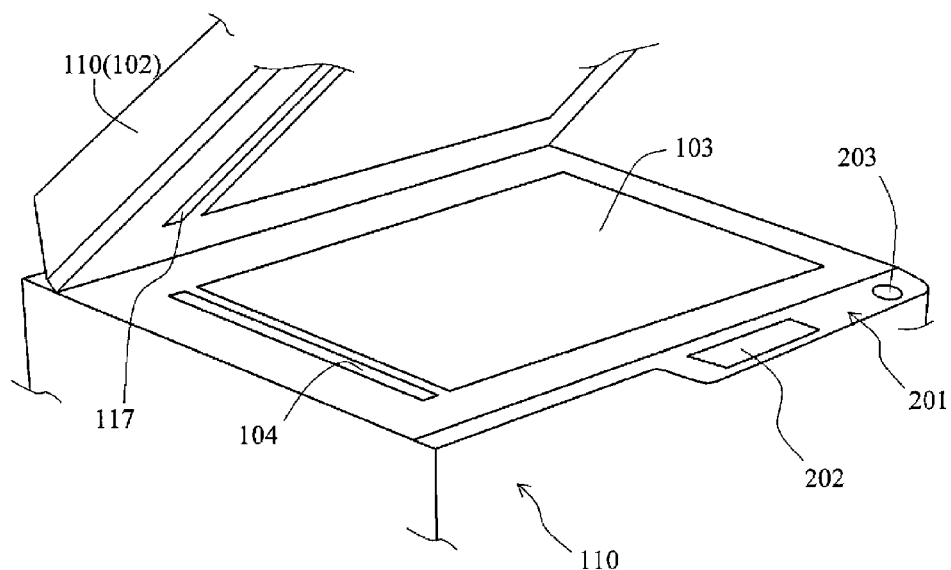
FIG. 2 obliquely illustrates an upper external appearance of the multi-functional peripheral according to the one embodiment.

FIG. 2 obliquely illustrates the upper external appearance of the multi-functional peripheral 100. As described above, the slit glass 104 is arranged adjacent to the platen 103, and the image reading position 117 of the document feeder 110 is arranged facing to the slit glass 104.

An operation panel 201 with which a user enters an instruction and various settings into the multi-functional peripheral 100 is located at the front side of the multi-functional peripheral 100. In the embodiment, the operation panel 201 includes a touch panel type display 202 used for displaying an instruction input and various information, and a start button 203 for instructing a start of processing.

Figure 3:
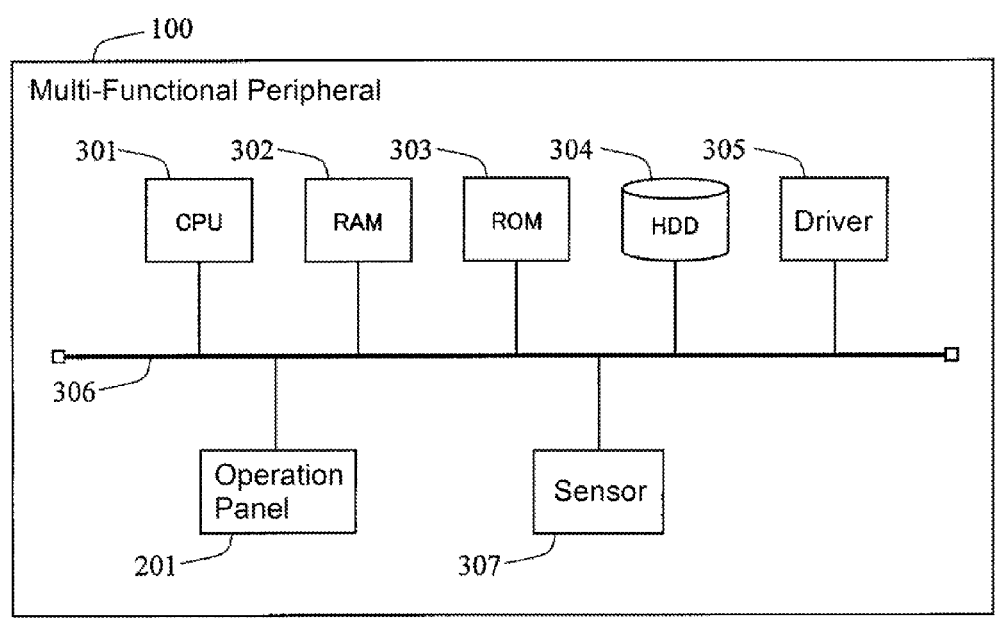
FIG. 3 illustrates a hardware configuration of the multi-functional peripheral according to the one embodiment.

FIG. 3 illustrates a hardware configuration of the control system in the multi-functional peripheral 100. In the multi-functional peripheral 100 of the embodiment, a central processing unit (CPU) 301, a random access memory (RAM) 302, a read only memory (ROM) 303, a hard disk drive (HDD) 304, and a driver 305 that corresponds to the respective driving units in the document feeder 110, the image reading unit 120, and the image forming unit 140 are connected via an internal bus 306.

The ROM 303, which is a non-transitory recording medium, HDD 304, and similar memory stores programs, and the CPU 301 controls the multi-functional peripheral 100 according to the instructions of the control programs. For example, the CPU 301 uses the RAM 302 as a work area and controls the operation of the above-described respective driving units by transmitting and receiving data and instructions with the driver 305. Further, the HDD 304 is also used for accumulating the image data that is obtained by the image reading unit 120 and is received from other devices via a network.

The operation panel 201 and various kinds of sensors 307 are connected to the internal bus 306. The operation panel 201 accepts operation of a user and supplies a signal based on the operation to the CPU 301. The operation panel 201 displays an operation screen in a display 202 based on a control signal from the CPU 301. The sensor 307 includes various kinds of sensors such as an open and close detection sensor of the platen cover 102, a document detection sensor on the document tray 111, a document detection sensor (a document size detection sensor) on the platen 103, a temperature sensor of a fixing unit, and a detection sensor for a paper sheet or document that is conveyed.

The CPU 301 ensures the following respective units (function block) by executing the programs stored, for example, in the ROM 303 and controls the operation of the respective units corresponding to the signals from these sensors.

Figure 4:
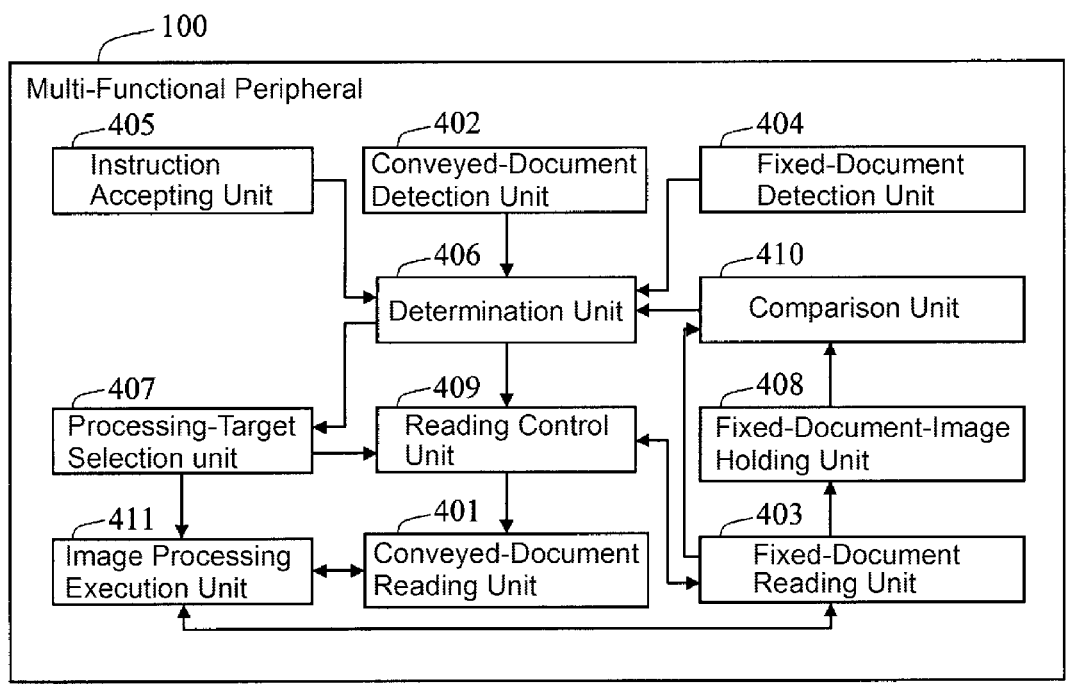
FIG. 4 illustrates a function block diagram of the multi-functional peripheral according to the one embodiment.

FIG. 4 illustrates a function block diagram of the multi-functional peripheral 100 of the embodiment. As illustrated in FIG. 4, the multi-functional peripheral 100 of the embodiment includes a conveyed-document reading unit 401, a conveyed-document detection unit 402, a fixed-document reading unit 403, a fixed-document detection unit 404, an instruction accepting unit 405, a determination unit 406, and a processing-target selection unit 407.

The conveyed-document reading unit 401 obtains the image data of the document conveyed to the image reading position 117 by the document feeder 110. As described above, the conveyed-document reading unit 401 causes the first carriage 122 and second carriage 123 of the image reading unit 120 to be temporarily motionless such that the first carriage 122 and second carriage 123 align with the image reading position 117, and causes the image reading unit 120 to generate the image data of the document passing through the image reading position 117. In the embodiment, the conveyed-document reading unit 401 temporarily holds the image data obtained through the image reading unit 120. In the embodiment, the RAM 302 and the HDD 304 serve as an image data storage region of the conveyed-document reading unit 401.

The conveyed-document detection unit 402 detects existence of the document on the document tray 111. Although not specifically limited, in the embodiment, the conveyed-document detection unit 402 detects the existence of the document on the document tray 111 by using the document detection sensor located on the document tray 111. Any known sensor can be used for the document detection sensor. For example, a contactless sensor, such as reflection type photo sensor (photoreflector) where a light-emitting portion and light receiving portion are arranged on one surface, and a transmission type photo sensor (photointerrupter) where an light-emitting portion and light receiving portion are arranged facing one another, can constitute the document detection sensor. Further, a contact type sensor can be used to constitute the document detection sensor. The contact type sensor includes an actuator that is brought in contact with the document loaded on a document loading surface and varies its position between a state with the document on the document loading surface and a state without the document on the document loading surface, and a sensor that detects the position variation of the actuator.

The fixed-document reading unit 403 obtains the image data of the document placed on the platen 103. As described above, the fixed-document reading unit 403 causes the first carriage 122 and second carriage 123 of the image reading unit 120 to move in the sub-scanning direction 135 and causes the image reading unit 120 to generate the image data of the document placed on the platen 103. In the embodiment, the fixed-document reading unit 403 temporarily holds the image data obtained through the image reading unit 120. In the embodiment, the RAM 302 and the HDD 304 serve as an image-data storage region of the fixed-document reading unit 403.

The fixed-document detection unit 404 detects existence of the document on the platen 103. Although not specifically limited, for example, using known document size detection method can detect existence of the document on the platen 103. The document size detection method can use a configuration, for example, that optically detects a document size with a plurality of photoreflectors located below the platen 103 corresponding to the document size. Further, the document size detection method can use a configuration that generates the image data by moving the scanning optical system 121 below the side of the slit glass 104 of the platen 103, and detects an edge of the document in a main-scanning direction by an edge detection in a direction (main-scanning direction) perpendicular to the moving direction of the carriage (for example, the first carriage 122). Such detection of document existence by use of the document size detection may be performed, as conventional size detection, at a timing immediately before the platen cover 102 becomes a completely closed state during a process from an open state to a closed state of the platen cover 102, or detection of document existence may be performed at a timing when confirmation of document existence on the platen 103 is needed, irrespective of the document size detection. In the former case, the fixed-document detection unit 404 refers to a result of the document size detection that has already performed at the timing when confirmation of document existence on the platen 103 was needed, and detects the presence of the document when any document size has been detected.

The instruction accepting unit 405 accepts a document-reading-start instruction by a user. A document-reading-start instruction by a user is entered, for example, by pressing down the start button 203 located in the operation panel 201.

Upon acceptance of the document-reading-start instruction by the instruction accepting unit 405, the determination unit 406 determines whether or not the document on the platen 103 is a left document when the document on the document tray 111 and the document on the platen 103 are detected by the conveyed-document detection unit 402 and the fixed-document detection unit 404. Although not specifically limited, in the embodiment, the determination unit 406 determines whether or not the document is the left document via a fixed-document-image holding unit 408, a reading control unit 409, and a comparison unit 410 included in the multi-functional peripheral 100.

Here, the fixed-document-image holding unit 408 holds the image data that has been previously obtained by the fixed-document reading unit 403 and has become an image-processing target. Although not specifically limited, in the embodiment, the RAM 302 and the HDD 304 serve as the image-data storage region of the fixed-document-image holding unit 408.

Upon acceptance of the document-reading-start instruction by the instruction accepting unit 405, the reading control unit 409 instructs the fixed-document reading unit 403 and the conveyed-document reading unit 401 to obtain the image data when the document on the document tray 111 and the document on the platen 103 are detected by the conveyed-document detection unit 402 and the fixed-document detection unit 404.

The comparison unit 410 compares the image data obtained by the fixed-document reading unit 403 corresponding to the instruction from the reading control unit 409 and the image data held in the fixed-document-image holding unit 408.

In this configuration, when presence of identical images is determined by the comparison unit 410, the determination unit 406 determines that the document on the platen 103 is the left document. When absence of the identical images is determined by the comparison unit 410, the determination unit 406 determines that the document on the platen 103 is not the left document. Namely, the determination unit 406 determines that the document is the left document when the document, which is placed on the platen 103 at that time, is one of which image data has already been obtained, and that the document is not the left document when the document is not the one of which image data has not been obtained yet.

In the configuration described above, although the fixed-document-image holding unit 408 may have a configuration that holds only the image data obtained by the immediately previous image reading operation with the fixed-document reading unit 403, in the embodiment, the fixed-document-image holding unit 408 employs a configuration that holds a plurality of previously obtained image data. This ensures recognition of the left document even in the case, for example, as follows: other user noticing a left document on the platen 103 once removes the left document, places own document on the platen 103, and obtains the image data, then the user returns the removed left document on the platen 103 again.

The plurality of image data held in the fixed-document-image holding unit 408 are destroyed (deleted) at a preliminarily specified timing. Here, the preliminarily specified timing can be employed as follows: a timing when the reading process by the fixed-document reading unit 403 is performed by a preliminarily specified number of times (for example, three times) after the image data has been obtained; a timing when a preliminarily specified holding time (for example, five minutes) has elapsed after the image data has been obtained; and similar timing. This ensures prevention of the case that the document of which image data is obtained by the fixed-document reading unit 403 continues to be determined as the left document.

When the document on the platen 103 is apparently the left document, the determination unit 406 may determine that the document on the platen 103 is the left document, without comparison of the image data by the comparison unit 410. The case that the document on the platen 103 is apparently the left document includes, for example, the case where a preliminarily specified time has elapsed without making the platen cover 102 open state, after the image data was obtained by the fixed-document reading unit 403 or similar case.

When the document is determined to be the left document by the determination unit 406, the processing-target selection unit 407 set the image data obtained by the conveyed-document reading unit 401 as a processing target. When the document is determined not to be the left document by the determination unit 406, the processing-target selection unit 407 inquires which following image data to be set as the processing target of a user: the image data obtained by the conveyed-document reading unit 401; and the image data obtained by the fixed-document reading unit 403. This inquiry can be performed, for example, by displaying a selection button for selecting the image data obtained by the conveyed-document reading unit 401 as the processing target and a selection button for selecting the image data obtained by the fixed-document reading unit 403 as the processing target, in the display 202 of the operation panel 201.

Although not specifically limited, in the embodiment, it is configured that an image-processing execution unit 411 executes the image processing such as storage and a print job with respect to the image data of the processing target, in the multi-functional peripheral 100. The processing-target selection unit 407 ensures the image processing by notifying the image-processing execution unit 411 of the image data of the processing target.

Figure 5:
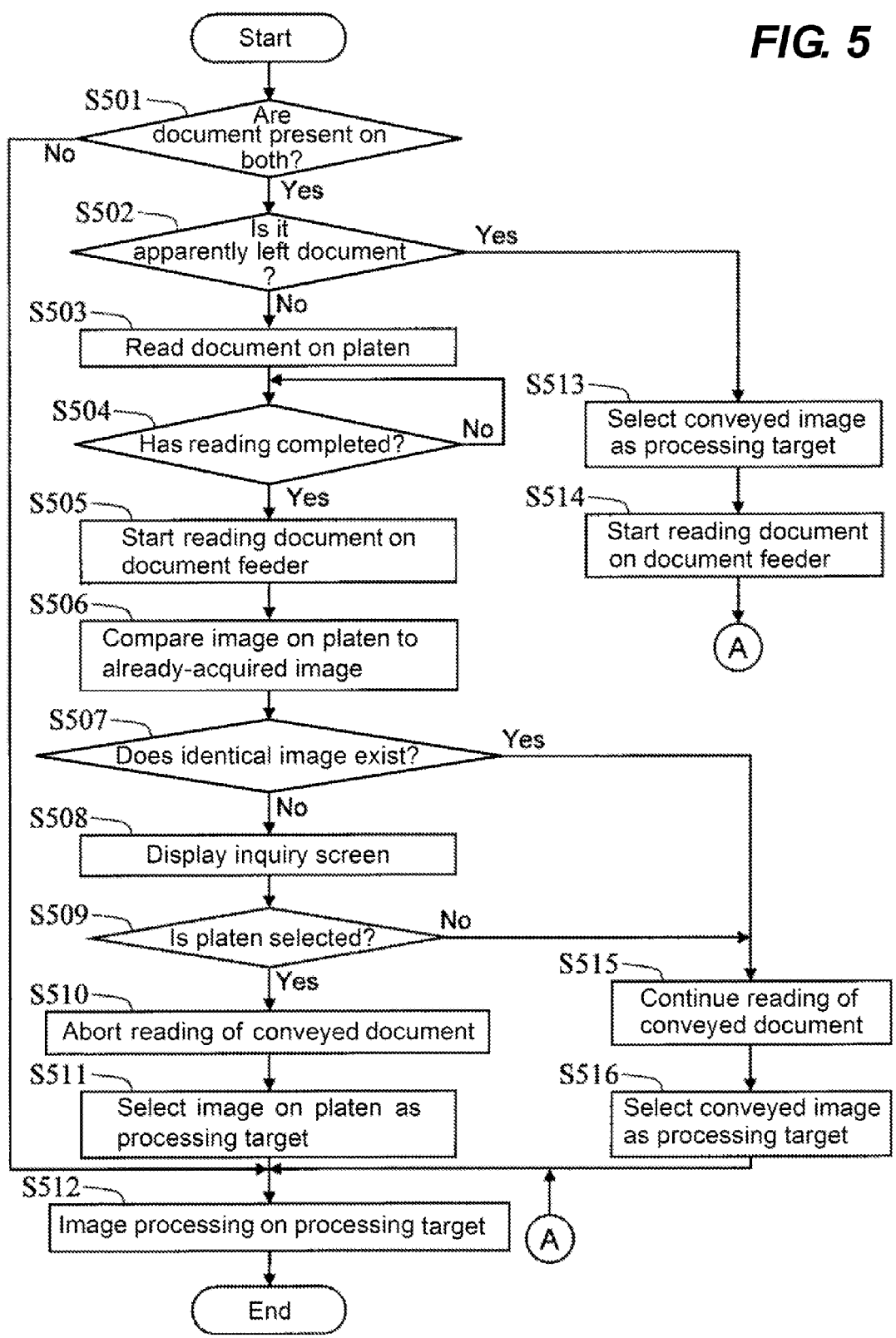
FIG. 5 illustrates an exemplary image reading procedure executed by the multi-functional peripheral according to the one embodiment.

FIG. 5 illustrates an exemplary image reading procedure that the multi-functional peripheral 100 executes. Acceptance of the document-reading-start instruction by a user with the instruction accepting unit 405 triggers a start of this procedure.

When the procedure starts, the determination unit 406 inquires the existence of the document on the document tray 111 of the conveyed-document detection unit 402. The determination unit 406 inquires the existence of the document on the platen 103 of the fixed-document detection unit 404 (Step S501).

When only one of the conveyed-document detection unit 402 and the fixed-document detection unit 404 detects the document, the determination unit 406 does not specifically operate (No at Step S501). As a result, the image data of the detected document is generated, and the image-processing execution unit 411 executes the image processing such as storage and a print job specified by a user with respect to this image data (Step S512). Namely, when only the conveyed-document detection unit 402 has detected the document, the image-processing execution unit 411 performs the image processing to the image data obtained by the conveyed-document reading unit 401. Further, when only the fixed-document detection unit 404 has detected the document, the image-processing execution unit 411 performs the image processing to the image data obtained by the fixed-document reading unit 403. When the fixed-document reading unit 403 obtains the image data and the image processing is performed, the fixed-document reading unit 403 registers the obtained image data to the fixed-document-image holding unit 408 along with time information indicative of the time when the image data is obtained.

When both of the conveyed-document detection unit 402 and the fixed-document detection unit 404 detect the document, the determination unit 406, by the method described above, determines whether or not the document on the platen 103 is apparently the left document (Yes at Step S501, Step S502).

When the document is determined to be apparently the left document, the determination unit 406 notifies the processing-target selection unit 407 of the fact (Yes at Step S502). Corresponding to this notification, the processing-target selection unit 407 set the image data obtained by the conveyed-document reading unit 401 as the processing target (Step S513). At this time, the processing-target selection unit 407 notifies the reading control unit 409 of the fact. Corresponding to this notification, the reading control unit 409 instructs the conveyed-document reading unit 401 to obtain the image data. Corresponding to this instruction, the conveyed-document reading unit 401 start reading of the document placed on the document tray 111 (Step S514).

The processing-target selection unit 407 notifies the image-processing execution unit 411 of the fact that the image data obtained by the conveyed-document reading unit 401 is set as the processing target. Corresponding to this notification, the image-processing execution unit 411 executes the image processing such as storage and a print job specified by the user with respect to the image data obtained by the conveyed-document reading unit 401 (Step S512).

When the document is not determined to be apparently the left document, the determination unit 406 notifies the reading control unit 409 of the fact (No at Step S502). Corresponding to this notification, the reading control unit 409 instructs the fixed-document reading unit 403 and the conveyed-document reading unit 401 to obtain the image data. At this time, the reading control unit 409 first instructs the fixed-document reading unit 403 to obtain the image data.

Corresponding to this instruction, the fixed-document reading unit 403 starts reading of the document placed on the platen 103 (Step S503).

After completion of the reading of the document, the fixed-document reading unit 403 notifies the reading control unit 409 of the fact (Yes at Step S504). Corresponding to this notification, the reading control unit 409 instructs the conveyed-document reading unit 401 to obtain the image data. Corresponding to this instruction, the conveyed-document reading unit 401 starts reading of the document placed on the document tray 111 (Step S505).

After completion of the reading of the document, the fixed-document reading unit 403 notifies the comparison unit 410 of the fact. Corresponding to this notification, the comparison unit 410 compares the image data obtained by the fixed-document reading unit 403 corresponding to the instruction from the reading control unit 409 and the image data held in the fixed-document-image holding unit 408 (Step S506). Then, the comparison unit 410 notifies the determination unit 406 of the comparison result (whether or not the identical images exist).

As described above, in the embodiment, the fixed-document-image holding unit 408 holds the image data that has already been obtained by the fixed-document reading unit 403 and to which the preliminarily specified holding time has not elapsed from the obtainment. Thus, when the fixed-document-image holding unit 408 holds the plurality of the image data, the comparison unit 410 compares the image data obtained by the fixed-document reading unit 403 corresponding to the instruction from the reading control unit 409 and all the image data held in the fixed-document-image holding unit 408.

When the comparison result by the comparison unit 410 indicates absence of the identical images, the determination unit 406 notified from the comparison unit 410 determines that the document on the platen 103 is not the left document (No at Step S507). Then, the determination unit 406 notifies the processing-target selection unit 407 of the fact. Corresponding to this notification, the processing-target selection unit 407 inquires which following image data to be set as the processing target of a user: the image data obtained by the conveyed-document reading unit 401; and the image data obtained by the fixed-document reading unit 403 (Step S508). As described above, this inquiry can be performed by displaying an inquiry screen including a selection button in the display 202 of the operation panel 201.

When the user selects the document on the platen 103 in the inquiry screen, the processing-target selection unit 407 notifies the reading control unit 409 of the fact (Yes at Step S509). Corresponding to this notification, the reading control unit 409 instructs the conveyed-document reading unit 401 to abort the obtainment of the image data. Corresponding to this instruction, the conveyed-document reading unit 401 aborts the reading of the document placed on the document tray 111 (Step S510). At this time, to prevent the state where the documents become separated into the document tray 111 of the document feeder 110 and the sheet discharge tray 112, it is preferable to continue only document conveyance to convey all the document into the sheet discharge tray 112.

At this time, the processing-target selection unit 407 notifies the image-processing execution unit 411 of the fact that the image data obtained by the fixed-document reading unit 403 has been set as the processing target corresponding to the user's selection (Step S511). Corresponding to this notification, the image-processing execution unit 411 executes the image processing such as storage and a print job specified by the user with respect to the image data obtained by the fixed-document reading unit 403 (Step S512). At this time, the fixed-document reading unit 403 registers the obtained image data to the fixed-document-image holding unit 408 along with the time information indicative of the time when the image data was obtained.

Further, when the user selects the document on the document tray 111 in the inquiry screen, the processing-target selection unit 407 notifies the reading control unit 409 of the fact (No at Step S509). Corresponding to this notification, the reading control unit 409 instructs the conveyed-document reading unit 401 to continue the obtainment of the image data (Step S515).

Further, at this time, the processing-target selection unit 407 notifies the image-processing execution unit 411 of the fact that the image data obtained by the conveyed-document reading unit 401 has been set as the processing target corresponding to the user's selection (Step S516). Corresponding to this notification, the image-processing execution unit 411 executes the image processing such as storage and a print job specified by the user with respect to the image data obtained by the conveyed-document reading unit 401 (Step S512).

On the other hand, when the comparison result by the comparison unit 410 indicates the presence of the identical images, the determination unit 406 notified from the comparison unit 410 determines that the document on the platen 103 is the left document (Yes at Step S507). Then, the determination unit 406 notifies the processing-target selection unit 407 of the fact. Corresponding to this notification, the processing-target selection unit 407 sets the image data obtained by the conveyed-document reading unit 401 as the processing target (Step S515, S516). At this time, the conveyed-document reading unit 401 continues to obtain the image data.

Further, at this time, the processing-target selection unit 407 notifies the image-processing execution unit 411 of the fact that the image data obtained by the conveyed-document reading unit 401 has been set as the processing target. Corresponding to this notification, the image-processing execution unit 411 executes the image processing such as storage and a print job specified by the user with respect to the image data obtained by the conveyed-document reading unit 401 (Step S512).

As described above, when the documents are detected both on the document tray 111 and on the platen 103, the multi-functional peripheral 100 determines whether or not the document on the platen 103 is the left document. Then, when the document is determined to be the left document, the image data obtained by the conveyed-document reading unit 401 is selected as the processing target for the processing such as storage and a print job. Namely, when the document on the platen 103 is the left document, the image data obtained by the conveyed-document reading unit 401 is determined as the processing target without inquiring from the user. Consequently, this ensures reduction the number of setting operations required to the user compared to a conventional configuration where a user sets which image data of the documents to select every time when the documents are detected both on the document tray 111 and on the platen 103.

Further, when the additionally obtained image data of the document on the platen 103 and the image data held in the fixed-document-image holding unit 408 are identical, the multi-functional peripheral 100 determines that the document on the platen 103 is the left document. Thus, this enables determination of whether or not the document is the left document more reliably.

Now, a recent multi-functional peripheral widely employs a configuration of including authentication function. The following describes a configuration applied to a digital multi-functional peripheral with the authentication function. A description of the overall configuration of the digital multi-functional peripheral will be omitted herein because of similarity with the multi-functional peripheral 100.

Figure 6:
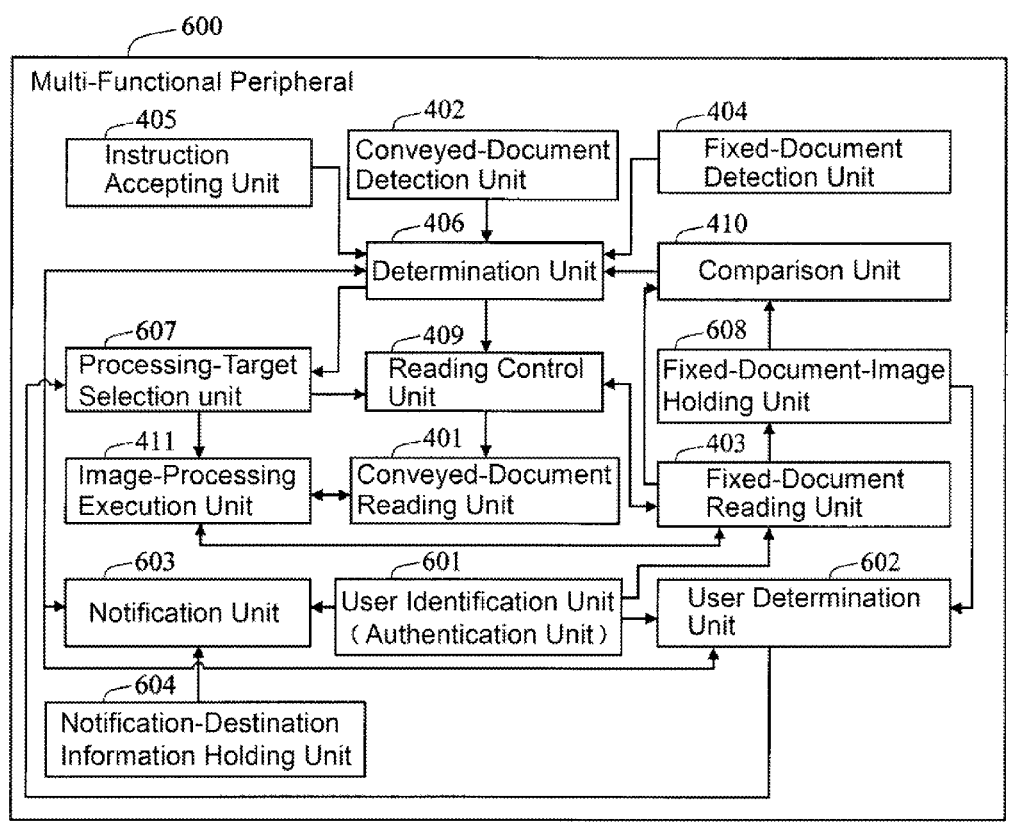
FIG. 6 illustrates a function block diagram of another multi-functional peripheral according to the one embodiment.

FIG. 6 illustrates a function block diagram of other multi-functional peripheral of the embodiment. As illustrated in FIG. 6, a multi-functional peripheral 600 of the embodiment includes a user Identification unit 601 and a user determination unit 602, in addition to the configuration of the multi-functional peripheral 100. While a processing-target selection unit 607 and a fixed-document-image holding unit 608 have functions similar to the processing-target selection unit 407 and the fixed-document-image holding unit 408 described above, processing items are slightly different due to cooperation with an authentication function as described below. Other configurations are similar to the multi-functional peripheral 100 illustrated in FIG. 4.

The user Identification unit 601 identifies a user operating the multi-functional peripheral 600. The user Identification unit 601 is what is called an authentication unit and executes a user authentication process by determining whether or not user authentication information entered via the operation panel 201 or similar panel satisfies an authentication condition that is preliminarily registered. Here, a user enters the user authentication information using an on-screen keyboard displayed in the display 202.

The multi-functional peripheral 600 uses a user ID assigned univocally to each user and a password associated with the user ID as the user authentication information. The user ID may be information that can identify a user and, here, is configured with the information including a character, a symbol, or similar sign that can be entered with an on-screen keyboard. The password is also configured with the information including a character, a symbol, or similar sign that can be entered with an on-screen keyboard.

In the embodiment, a permitted-user list is preliminarily registered in the user Identification unit 601. The permitted-user list stores the user ID of the user permitted to use the multi-functional peripheral 600 and the password associated with the user ID. When the user ID and the password entered via the operation panel 201 or similar panel are included in the permitted-user list, the user Identification unit 601 determines that the user authentication condition is satisfied. When the user authentication condition is satisfied, the user Identification unit 601 permits the user using the multi-functional peripheral 600 (generation of image data in the image reading unit 120, printing the image data in the image forming unit 140, and similar operation). When the user authentication condition is not satisfied, the user Identification unit 601 forbids the user from using the multi-functional peripheral 600. Consequently, the user Identification unit 601 can identify the user operating the multi-functional peripheral 600 with the user ID.

Further, in the embodiment, the fixed-document-image holding unit 608 holds the image data previously obtained by the fixed-document reading unit 403 similar to the fixed-document-image holding unit 408 described above. However, different from the fixed-document-image holding unit 408 described above, the fixed-document-image holding unit 608 holds the image data previously obtained by the fixed-document reading unit 403 by associating with the information (here, the user ID) that identifies the user that has obtained the image data.

Upon acceptance of the document-reading-start instruction by the instruction accepting unit 405, the user determination unit 602 determines whether or not the user, who is identified with the information associated with the image data held in the fixed-document-image holding unit 608, and the user operating the multi-functional peripheral 600 are identical, when the documents both on the document tray 111 and on the platen 103 are detected by the conveyed-document detection unit 402 and the fixed-document detection unit 404.

When the user determination unit 602 determines identity of the user, the processing-target selection unit 607 inquires which image data, which is obtained by the conveyed-document reading unit 401 and which is obtained by the fixed-document reading unit 403, to be set as the processing target of the user. When the user determination unit 602 determines non-identity of the users, the processing-target selection unit 607 sets the image data obtained by the conveyed-document reading unit 401 as the processing target based on the determination that the document on the platen 103 is the left document by the determination unit 406. Furthermore, when the user determination unit 602 does not determine the identity of the user, the processing-target selection unit 607 inquires which image data, which is obtained by the conveyed-document reading unit 401 and which is obtained by the fixed-document reading unit 403, to be set as the processing target of the user based on the determination that the document on the platen 103 is not the left document by the determination unit 406. Namely, when the user determination unit 602 determines identity of the user, the processing-target selection unit 607 is configured to inquire which image data to be set as the processing target of the user, even when determination unit 406 determines that the document on the platen 103 is the left document.

As illustrated in FIG. 6, the multi-functional peripheral 600 of the embodiment further includes a notification unit 603 and a notification-destination-information holding unit 604.

When the determination unit 406 determines the left document, the notification unit 603 notifies the user that left the document of the fact. A notification method may be the one that the user can recognize, and is not specifically limited. In the embodiment, based on the information of the notification destination associated with the information that is preliminarily held in the notification-destination-information holding unit 604 and identifies the user, the notification unit 603 transmits an e-mail notifying presence of the left document to the notification destination.

Figure 7:
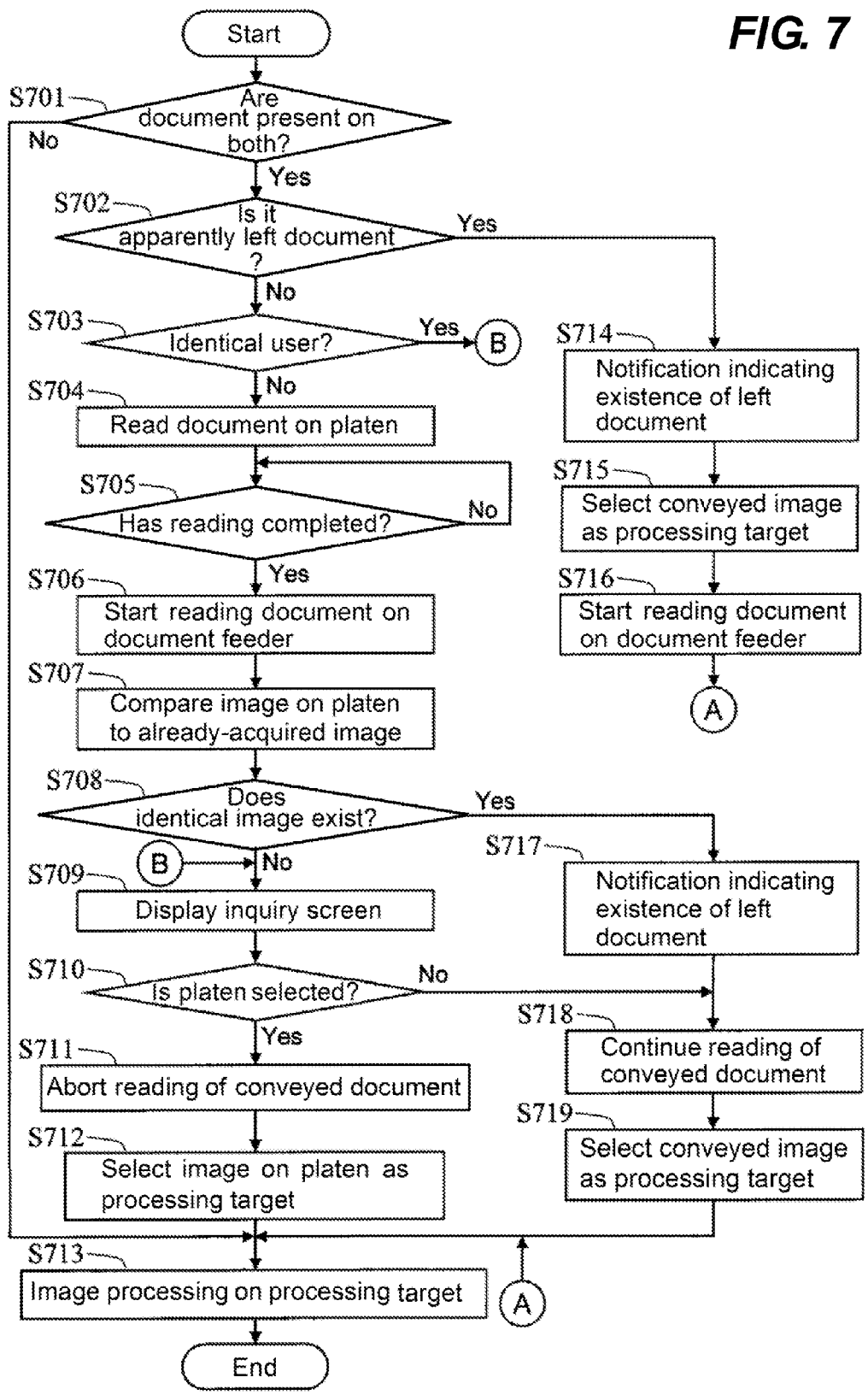
FIG. 7 illustrates an exemplary image reading procedure executed by another multi-functional peripheral according to the one embodiment.

FIG. 7 illustrates an exemplary image reading procedure that the multi-functional peripheral 600 executes. An acceptance of the document-reading-start instruction from the user by the instruction accepting unit 405 triggers the start of the procedure.

When the procedure starts, the determination unit 406 inquires the existence of the document on the document tray 111 of the conveyed-document detection unit 402. Further, the determination unit 406 inquires the existence of the document on the platen 103 of the fixed-document detection unit 404 (Step S701).

When only one of the conveyed-document detection unit 402 and the fixed-document detection unit 404 detects the document, the determination unit 406 does not specifically operate, similar to the multi-functional peripheral 100 described above (No at Step S701). As a result, the image data of the detected document is generated, and the image-processing execution unit 411 executes the image processing such as storage and a print job specified by the user with respect to the image data (Step S713). When the fixed-document reading unit 403 obtains the image data, the fixed-document reading unit 403 registers the obtained image data to the fixed-document-image holding unit 608 along with the user ID of the user having obtaining the image data and the time information indicative of the time when the image data was obtained.

When both of the conveyed-document detection unit 402 and the fixed-document detection unit 404 detects the document, the determination unit 406 determines whether or not the document on the platen 103 is apparently the left document, by the above-described method (Yes at Step S701, Step S702).

When the document on the platen 103 is determined to be apparently the left document, the determination unit 406 notifies the processing-target selection unit 607 of the fact (Yes at Step S702). Corresponding to this notification, the processing-target selection unit 607 instructs the notification unit 603 to transmit a left-document notification. Corresponding to this instruction, the notification unit 603 identifies the user that placed the left document on the platen 103, and transmits the e-mail that describes the presence of the left document on the platen 103 of the multi-functional peripheral 600 to the destination held in the notification-destination-information holding unit 604 (Step S714). In the embodiment, the fixed-document detection unit 404 is configured to detect the existence of the document based on the result of the document size detection described above, and, for example, the fixed-document-image holding unit 608 is configured to hold the user ID of the user operating the multi-functional peripheral 600 during the document size detection. Thus, this ensures easy identification of the user that placed the left document on the platen 103.

Further, the processing-target selection unit 607 sets the image data obtained by the conveyed-document reading unit 401 as the processing target, corresponding to the notification from the determination unit 406 (Step S715). At this time, the processing-target selection unit 607 notifies the reading control unit 409 of the fact. Corresponding to this notification, the reading control unit 409 instructs the conveyed-document reading unit 401 to obtain the image data. Corresponding to this instruction, the conveyed-document reading unit 401 starts the reading of the document placed on the document tray 111 (Step S716).

Further, the processing-target selection unit 607 notifies the image-processing execution unit 411 of the fact that the image data obtained by the conveyed-document reading unit 401 has been set as the image-processing. Corresponding to this notification, the image-processing execution unit 411 executes the image processing such as storage and a print job specified by the user with respect to the image data obtained by the conveyed-document reading unit 401 (Step S713).

When the document on the platen 103 was not able to be determined to be apparently the left document, the determination unit 406 notifies the user determination unit 602 of the fact (No at Step S702). Corresponding to this notification, the user determination unit 602 determines whether or not the user identified by the information associated with the image data held in the fixed-document-image holding unit 608 and the user operating the multi-functional peripheral 600 identified by the user Identification unit 601 are identical (Step S703). When completing the determination, the user determination unit 602 notifies the determination unit 406 of the determination result.

As described above, in the embodiment, the fixed-document-image holding unit 608 holds the image data that has already been obtained by the fixed-document reading unit 403 and of which the preliminarily specified holding time has not elapsed from the obtainment. Here, when the fixed-document-image holding unit 608 holds the plurality of image data, the user determination unit 602 determines whether or not the user identified by the information associated with the latest image data and the user operating the multi-functional peripheral 600 are identical.

When the users are not identical, the determination unit 406 notifies the reading control unit 409 of the fact (No at Step S703). Corresponding to this notification, the reading control unit 409 instructs the fixed-document reading unit 403 and the conveyed-document reading unit 401 to obtain the image data. At this time, the reading control unit 409 first instructs the fixed-document reading unit 403 to obtain the image data. Corresponding to this instruction, the fixed-document reading unit 403 starts the reading of the document placed on the platen 103 (Step S704).

The fixed-document reading unit 403 having completed the reading of the document notifies the reading control unit 409 of the fact (Yes at Step S705). Corresponding to this notification, the reading control unit 409 instructs the conveyed-document reading unit 401 to obtain the image data. Corresponding to this instruction, the conveyed-document reading unit 401 starts the reading of the document placed on the document tray 111 (Step S706).

Further, the fixed-document reading unit 403 having completed the reading of the document notifies the comparison unit 410 of the fact. Corresponding to this notification, the comparison unit 410 compares the image data obtained by the fixed-document reading unit 403 corresponding to the instruction from the reading control unit 409 and the image data held in the fixed-document-image holding unit 608 (Step S707). Then, the comparison unit 410 notifies the determination unit 406 of the comparison result.

As described above, in the embodiment, the fixed-document-image holding unit 608 holds the image data that has already been obtained by the fixed-document reading unit 403 and of which the preliminarily specified holding time has not elapsed from the obtainment. Thus, when the fixed-document-image holding unit 608 holds the plurality of the image data, the comparison unit 410 compares the image data obtained by the fixed-document reading unit 403 corresponding to the instruction from the reading control unit 409 and all the image data held in the fixed-document-image holding unit 608.

When the comparison result by the comparison unit 410 indicates absence of the identical images, the notified determination unit 406 determines that the document on the platen 103 is not the left document (No at Step S708). Then, the determination unit 406 notifies the processing-target selection unit 607 of the fact. Corresponding to this notification, the processing-target selection unit 607 inquires which following image data to be set as the processing target of the user: the image data obtained by the conveyed-document reading unit 401; and the image data obtained by the fixed-document reading unit 403 (Step S709). As described above, this inquiry can be performed by displaying an inquiry screen including a selection button in the display 202 of the operation panel 201.

When the user selects the document on the platen 103 in the inquiry screen, the processing-target selection unit 607 notifies the reading control unit 409 of the fact (Yes at Step S710). Corresponding to this notification, the reading control unit 409 instructs the conveyed-document reading unit 401 to abort the obtainment of the image data. Corresponding to this instruction, the conveyed-document reading unit 401 aborts the reading of the document placed on the document tray 111 (Step S711).

At this time, the processing-target selection unit 607 notifies the image-processing execution unit 411 of the fact that the image data obtained by the fixed-document reading unit 403 has been set as the processing target corresponding to the user's selection (Step S712). Corresponding to this notification, the image-processing execution unit 411 executes the image processing such as storage and a print job specified by the user with respect to the image data obtained by the fixed-document reading unit 403 (Step S713). At this time, the fixed-document reading unit 403 registers the obtained image data to the fixed-document-image holding unit 608 along with the user ID of the user having obtained the image data and the time information indicative of the time when the image data was obtained.

Further, when the user selects the document on the document tray 111 in the inquiry screen, the processing-target selection unit 607 notifies the reading control unit 409 of the fact (No at Step S710). Corresponding to this notification, the reading control unit 409 instructs the conveyed-document reading unit 401 to continue the obtainment of the image data (Step S718)

Further, at this time, the processing-target selection unit 607 notifies the image-processing execution unit 411 of the fact that the image data obtained by the conveyed-document reading unit 401 has been set as the processing target corresponding to the user's selection (Step S719). Corresponding to this notification, the image-processing execution unit 411 executes the image processing such as storage and a print job specified by the user with respect to the image data obtained by the conveyed-document reading unit 401 (Step S713).

On the other hand, when the comparison result by the comparison unit 410 indicates the presence of the identical images, the determination unit 406 notified from the comparison unit 410 determines that the document on the platen 103 is the left document (Yes at Step S708). Then, the determination unit 406 notifies the processing-target selection unit 607 of the fact. Corresponding to this notification, the processing-target selection unit 607 instructs the notification unit 603 to transmit the left-document notification. Corresponding to this instruction, the notification unit 603 identifies the user identified by the information associated with the image data that is held in the fixed-document-image holding unit 608 and determined as the identical document, and then transmits the e-mail that describes the left document on the platen 103 of the multi-functional peripheral 600 to the destination held in the notification-destination-information holding unit 604 (Step S717).

Further, corresponding to the notification from the determination unit 406, the processing-target selection unit 607 sets the image data obtained by the conveyed-document reading unit 401 as the processing target (Step S718, S719). At this time, the conveyed-document reading unit 401 continues to obtain the image data.

At this time, the processing-target selection unit 607 notifies the image-processing execution unit 411 of the fact that the image data obtained by the conveyed-document reading unit 401 has been set as the processing target. Corresponding to this notification, the image-processing execution unit 411 executes the image processing such as storage and a print job specified by the user with respect to the image data obtained by the conveyed-document reading unit 401 (Step S713).

Further, when the users are identical in the determination by the user determination unit 602, the determination unit 406 notifies the processing-target selection unit 607 of the fact (Yes at Step S703). Corresponding to this notification, the processing-target selection unit 607 inquires which following image data to be set as the processing target of a user: the image data obtained by the conveyed-document reading unit 401; and the image data obtained by the fixed-document reading unit 403 (Step S709). The following processes are the same as described above and will be omitted.

As described above, when the documents are detected both on the document tray 111 and on the platen 103, the multi-functional peripheral 600 determines whether or not the document on the platen 103 is the left document. Then, when the document on the platen 103 is determined to be the left document, the image data obtained by the conveyed-document reading unit 401 is selected as the processing target for storage, a print job, and similar operation. Namely, when the document on the platen 103 is the left document, the image data obtained by the conveyed-document reading unit 401 is determined as the processing target without inquiring from the user. Consequently, this ensures reduction of the number of setting operations required to the user compared to a conventional configuration where a user sets which image data of the documents to select every time when the documents are detected both on the document tray 111 and on the platen 103.

Further, when the user determination unit 602 determines the identity of the user, the processing-target selection unit 607 is configured to inquire which image data to set as the processing target of the user, even when the determination unit 406 determines that the document on the platen 103 is the left document. Thus, when the identical user intentionally obtains the identical document image repeatedly using the platen 103, the document is not determined to be the left document erroneously.

Furthermore, because of the inclusion of the notification unit 603, the multi-functional peripheral 600 can automatically notify the user, who has left the document, of the left document. As a result, this ensures improvement of convenience for use.

The above-described respective embodiments do not limit the technical scope of the disclosure. Various modifications and applications are possible within the scope of the disclosure in addition to the already-described embodiments. For example, as an especially preferable aspect, the above-described embodiment exemplifies the configuration that compares the previously obtained image with the additionally obtained image and determines whether or not the document is the left document. However, as a compared with conventional manner, the following configuration ensures reduction of request for unnecessary setting operation to a user: the configuration that determines whether or not the document is the left document based on transition of a detection state of the fixed-document detection unit 404.

Further, the above-described image reading procedure is merely one example, and can be changed as necessary within a range providing identical operational effects.

Furthermore, the above-described embodiment embodies the disclosure as the digital multi-functional peripheral. However, the disclosure is not limited to this apparatus. The disclosure is also applicable to any image processing apparatus with an image reading function using a document feeder, such as a scanner, a facsimile, and a copier.

According to the disclosure, when both of a document placed on a document feeder and a document placed on a platen are situated, the apparatus side determines which reading of the document the user desires wherever possible. Thus, this apparatus ensures reduction of request for unnecessary setting operation to a user, and is effective as an image processing apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus comprising:
   a document conveying mechanism that is configured to convey a document placed on a document tray to an image reading position one by one;
   a conveyed-document reading unit that is configured to obtain image data of the document conveyed to the image reading position by the document conveying mechanism;
   a conveyed-document detection unit that is configured to detect existence of a document on the document tray;
   a platen having a document loading surface configured to be used for a document placed without conveyance by the document conveying mechanism;
   a fixed-document reading unit that is configured to obtain image data of the document placed on the platen;
   a fixed-document detection unit that is configured to detect existence of the document on the platen;
   a platen cover that opens and closes the platen, the platen cover being formed integrally with the document conveying mechanism;
   a user identification unit that is configured to identify a user who is operating the image processing apparatus;
   a fixed-document-image holding unit that associates image data previously obtained by the fixed-document reading unit with information that is configured to identify a user who has obtained the image data, and holds the associated image data;
   an instruction accepting unit that is configured to accept a document-reading-starting instruction by a user;
   a user determination unit that, when the instruction accepting unit accepts the start instruction of the document reading, and the conveyed-document detection unit and the fixed-document detection unit respectively detect a document on the document tray and a document on the platen, is configured to determine whether a user identified by information associated with latest image data held by the fixed-document-image holding unit is identified as a user who is operating the image processing apparatus or not;
   a reading control unit that instructs the fixed-document reading unit and the conveyed-document reading unit to obtain the image data when the document on the document tray and the document on the platen are respectively detected by the conveyed-document detection unit and the fixed-document detection unit, upon acceptance of the document-reading-starting instruction by the instruction accepting unit;
   a comparison unit that compares the image data obtained by the fixed-document reading unit corresponding to an instruction from the reading control unit with the image data held in the fixed-document-image holding unit;
   a determination unit that is configured to determine whether a document on the platen is a left document or not, the determination unit determining that (i) the document on the platen is the left document when the comparison unit determines existence of an identical image, (ii) the document on the platen is not the left document when the comparison unit determines absence of the identical image, and (iii) the document on the platen is an apparent left document when the document continuously remains on the platen for a predetermined period after the image data is obtained by the fixed-document reading unit while the platen cover continues to close the platen for the predetermined period; and
   a processing target selection unit that is configured to inquire which image data, image data obtained by the conveyed-document reading unit or obtained by the fixed-document reading unit, to set as a processing target when the user determination unit has determined that the users are identical,
   determine the image data obtained by the conveyed-document reading unit as the processing target when the user determination unit has determined that the users are not identical and the determination unit has determined that the document on the platen is the left document,
   inquire which image data, image data obtained by the conveyed-document reading unit or obtained by the fixed-document reading unit, to set as the processing target when the user determination unit has determined that the users are not identical, and the determination unit has determined that the document on the platen is not the left document, and
   determine the image data obtained by the conveyed-document reading unit as the processing target when the determination unit has determined that the document on the platen is the apparent left document.

2. The image processing apparatus according to claim 1, wherein the fixed-document-image holding unit holds a plurality pieces of previously obtained image data.

3. The image processing apparatus according to claim 1, wherein the fixed-document-image holding unit destroys the image data where a preliminarily specified holding time has elapsed from the obtainment.

4. The image processing apparatus according to claim 1, further comprising:
   a notification destination information holding unit that holds information on notification destination as notification destination information associated with information that is configured to identify the user; and
   a notification unit that, when the determination unit has determined that the document on the platen is the left document, is configured to obtain a notification destination of the user identified by information associated with image data from the notification destination information to notify the notification destination of existence of the left document, the image data being determined as an identical document with the left document and is held by the fixed-document-image holding unit.

5. An image processing method comprising:
   preparing (i) a document conveying mechanism that is configured to convey a document placed on a document tray to an image reading position one by one, (ii) a platen having a document loading surface configured to be used for a document placed without conveyance by the document conveying mechanism and (iii) a platen cover that opens and closes the platen, the platen cover being formed integrally with the document conveying mechanism;

obtaining image data of the document conveyed to the image reading position by the document conveying mechanism;

detecting existence of the document on the document tray;

obtaining image data of a document placed on the platen;

detecting existence of the document on the platen;

identifying a user who is operating an image processing apparatus;

associating image data of the document which was placed on the platen and was previously obtained with information that is configured to identify a user who has obtained the image data, and holding the associated image data;

accepting a document-reading-starting instruction;

when the start instruction of the document reading is accepted, and a document on the document tray and a document on the platen are detected, determining whether a user identified by information associated with latest image data among the associated data is identified as a user who is operating the image processing apparatus or not;

obtaining the image data of the document on the document tray and the image data of the document on the platen when the document on the document tray and the document on the platen are detected, upon acceptance of the document-reading-starting instruction;

comparing the image data of the document on the platen, which is obtained in response to an instruction to obtain the image data, and the held associated image data;

determining that i) the document on the platen is the left document when an identical image exists, ii) the document on the platen is not the left document when the identical image does not exist, and iii) the document on the platen is an apparent left document when the document continuously remains on the platen for a predetermined period after the image data is obtained while the platen cover continues to close the platen for the predetermined period; and inquiring which image data, image data of the conveyed document or of the document on the platen, to set as a processing target when it is determined that the users are identical, determining the image data of the document conveyed to the image reading position as the processing target when it is determined that the users are not identical and the document on the platen is the left document, inquiring which image data, image data of the conveyed document or of the document on the platen, to set as the processing target when it is determined that the users are not identical and the document on the platen is not the left document, and determining the image data of the document conveyed to the image reading position as the processing target when it is determined that the document on the platen is the apparent left document.

6. The image processing method according to claim 5, further comprising:

holding information on notification destination as notification destination information associated with information that is configured to identify the user; and when it is determined that the document on the platen is the left document, obtaining a notification destination of the user identified by information associated with image data from the notification destination information to notify the notification destination of existence of the left document, the image data being determined as an identical document with the left document.

7. A non-transitory computer-readable recording medium storing an image processing program to control an image processing apparatus including a document conveying mechanism that is configured to convey a document placed on a document tray to an image reading position one by one, and a platen having a document loading surface configured to be used for a document placed without conveyance by the document conveying mechanism, wherein the image processing program causes the image processing apparatus to function as:

a conveyed-document reading unit that is configured to obtain image data of the document conveyed to the image reading position by the document conveying mechanism;

a conveyed-document detection unit that is configured to detect existence of a document on the document tray;

a fixed-document reading unit that is configured to obtain image data of the document placed on the platen;

a fixed-document detection unit that is configured to detect existence of the document on the platen;

a platen cover that opens and closes the platen, the platen cover being formed integrally with the document conveying mechanism;

a user identification unit that is configured to identify a user who is operating the image processing apparatus;

a fixed-document-image holding unit that associates image data previously obtained by the fixed-document reading unit with information that is configured to identify a user who has obtained the image data, and holds the associated image data;

an instruction accepting unit that is configured to accept a document-reading-starting instruction by a user;

a user determination unit that, when the instruction accepting unit accepts the start instruction of the document reading, and the conveyed-document detection unit and the fixed-document detection unit respectively detect a document on the document tray and a document on the platen, is configured to determine whether a user identified by information associated with latest image data held by the fixed-document-image holding unit is identified as a user who is operating the image processing apparatus or not;

a reading control unit that instructs the fixed-document reading unit and the conveyed-document reading unit to obtain the image data when the document on the document tray and the document on the platen are respectively detected by the conveyed-document detection unit and the fixed-document detection unit, upon acceptance of the document-reading-starting instruction by the instruction accepting unit;

a comparison unit that compares the image data obtained by the fixed-document reading unit corresponding to an instruction from the reading control unit with the image data held in the fixed-document-image holding unit;

a determination unit that is configured to determine whether a document on the platen is a left document or not, the determination unit determining that (i) the document on the platen is the left document when the comparison unit determines existence of an identical image, (ii) the document on the platen is not the left document when the comparison unit determines absence of the identical image, and (iii) the document on the platen is an apparent left document when the document continuously remains on the platen for a predetermined period after the image data is obtained by the fixed-document reading unit while the platen cover continues to close the platen for the predetermined period; and a processing target selection unit that is configured to
inquire which image data, image data obtained by the conveyed-document reading unit or obtained by the fixed-document reading unit, to set as a processing target when the user determination unit has determined that the users are identical, determine the image data obtained by the conveyed-document reading unit as the processing target when the user determination unit has determined that the users are not identical and the determination unit has determined that the document on the platen is the left document, inquire which image data, image data obtained by the conveyed-document reading unit or obtained by the fixed-document reading unit, to set as the processing target when the user determination unit has determined that the users are not identical, and the determination unit has determined that the document on the platen is not the left document, and determine the image data obtained by the conveyed-document reading unit as the processing target when the determination unit has determined that the document on the platen is the apparent left document.

8. The non-transitory computer-readable recording medium according to claim 7, wherein the image processing program further causes the image processing apparatus to function as:

a notification destination information holding unit that holds information on notification destination as notification destination information associated with information that is configured to identify the user; and a notification unit that, when the determination unit has determined that the document on the platen is the left document, is configured to obtain a notification destination of the user identified by information associated with image data from the notification destination information to notify the notification destination of existence of the left document, the image data being determined as an identical document with the left document and is held by the fixed-document-image holding unit.

* * * * *